(12) United States Patent
Ushida et al.

(10) Patent No.: US 9,274,280 B2
(45) Date of Patent: Mar. 1, 2016

(54) OPTICAL WAVEGUIDE TYPE OPTICAL TERMINATOR

(75) Inventors: Jun Ushida, Tokyo (JP); Shigeru Nakamura, Tokyo (JP); Shigeki Takahashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 1 day.

(21) Appl. No.: 14/119,746

(22) PCT Filed: May 10, 2012

(86) PCT No.: PCT/JP2012/061945
§ 371 (c)(1),
(2), (4) Date: Nov. 22, 2013

(87) PCT Pub. No.: WO2012/160980
PCT Pub. Date: Nov. 29, 2012

(65) Prior Publication Data
US 2014/0105544 A1    Apr. 17, 2014

(30) Foreign Application Priority Data
May 24, 2011    (JP) ................. 2011-115520

(51) Int. Cl.
*G02B 6/10* (2006.01)
*G02B 6/24* (2006.01)
*G02B 6/12* (2006.01)

(52) U.S. Cl.
CPC ....... *G02B 6/243* (2013.01); *G02B 6/12* (2013.01); *G02B 2006/12126* (2013.01)

(58) Field of Classification Search
CPC ................. G02B 6/243; G02B 6/2856
See application file for complete search history.

(56) References Cited

U.S. PATENT DOCUMENTS 6,298,178 B1 * 10/2001 Day et al. ............... 385/14
6,496,643 B1   12/2002 Gonthier et al.

FOREIGN PATENT DOCUMENTS

| JP | 2002-539464 A | 11/2002 |
| JP | 2008-176145 A | 7/2008 |
| JP | 2009-282449 A | 12/2009 |
| JP | 2010-181906 A | 8/2010 |
| JP | 2010-186132 A | 8/2010 |

OTHER PUBLICATIONS

R.A.Soref et al., "Electrooptical Effect in Silicon", IEEE Journal of Quantum Electronics, Jan. 1987, pp. 123-129, vol.QE-23, No. 1. Cited in the Specification.
H. Yamada et al., "Si Photonic Wire Waveguide Devices", IEEE Journal of Selected Topics in Quantum Electronics, Nov./Dec. 2006, pp. 1371-1379, vol. 12, No. 6. Cited in ISR.
International Search Report for PCT Application No. PCT/JP2012/061945, mailed on Jun. 26, 2012.

* cited by examiner

*Primary Examiner* — Ryan Lepisto
*Assistant Examiner* — Erin Chiem (57) ABSTRACT

An optical waveguide type optical terminator forms an optical waveguide structure including at least an optical absorption core (103) which is formed on a clad layer (102) and includes a portion composed of silicon in which an impurity of $10^{19}$ cm$^{-3}$ or more is doped, and is used by being optically connected in series with an optical waveguide including a core (105) composed of silicon. The optical absorption core (103) is sufficient provided that, at least, an impurity of around $10^{19}$ cm$^{-3}$ is doped therein. For example, its impurity concentration is sufficient provided that it falls within a range of $10^{19}$-$10^{20}$ cm$^{-3}$. The existence of this impurity causes absorption of light in the optical absorption core (103).

4 Claims, 6 Drawing Sheets

OPTICAL WAVEGUIDE TYPE OPTICAL TERMINATOR

This application is a National Stage Entry of PCT/JP2012/061945 filed on May 10, 2012, which claims priority from Japanese Patent Application 2011-115520 filed on May 24, 2011, the contents of all of which are incorporated herein by reference, in their entirety.

TECHNICAL FIELD

The present invention relates to an optical waveguide type optical terminator used in an optical waveguide device for use in an optical telecommunication field.

BACKGROUND ART

Information and telecommunications networks including the Internet as a representative thereof have been widely deployed all over the world as an infrastructure essential to people's lives. As technologies supporting the traffic of the Internet, there have been optical communication technologies each utilizing an optical fiber. An optical communication device employing a silicon platform, which can deal with a band of 1.3 μm and a band of 1.55 μm among optical fiber communication wavelength bands, has been expected as one which makes it possible to realize a high-density optical integrated circuit by utilizing a complementary metal oxide semiconductor (CMOS) fabrication technology.

As a particularly important technology among such optical communication technologies, there is an optical waveguide device fabrication technology. An optical waveguide device makes it possible to, unlike an optical device fabricated by splicing discrete optical parts, integrate a large number of optical devices. Accordingly, a design flexibility regarding optical devices is significantly improved. Moreover, fabrication technologies for semiconductor devices can be utilized, and thus, low-cost and large-scale-integrated devices can be achieved.

Examples of such an optical waveguide device include an optical splitter, an optical coupler, a wavelength multiplexer/de-multiplexer, an optical switch, an optical modulator and a variable optical attenuator. Nevertheless, there has been a problem that, when stray light or leakage light occurs inside such an optical waveguide device, it gives adverse effects on the characteristics of the optical waveguide device, such as an extinction ratio, cross talk and the like. Moreover, not only for a single device, but also for a device including a large number of optical devices integrated therein, there has been a problem that stray light or leakage light from a device gives adverse effects on the characteristics of another optical device.

Figure 13:
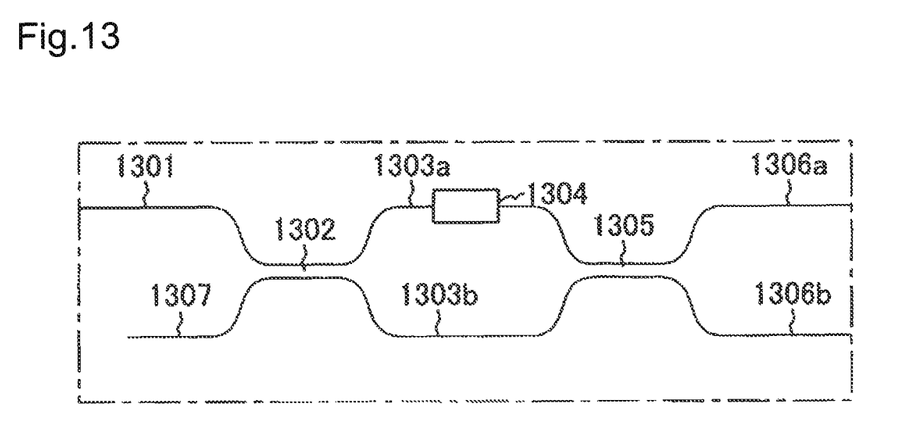
FIG. 13 is a block diagram illustrating a configuration of an optical switch realized by employing a Mach-Zehnder interferometer.

As a specific example of such a case, an optical switch realized by employing a Mach-Zehnder interferometer is exemplified here. As shown in FIG. 13, this optical switch, which is constituted by a Mach-Zehnder interferometer, turns on/off of each of light rays outputted from output ports 1306*a* and 1306*b* by causing a directional coupler 1302 to split a light ray from an input port 1301 into two light rays, causing a phase shifter 1304 to control a light phase difference between light rays having passed through two arms 1303*a* and 1303*b*, and then, causing a directional coupler 1305 to merge the light rays having passed through the two arms into a light ray again. At this time, although, normally, there is no input and output light at a dummy port 1307, leakage light from the dummy port 1307 of a device is likely to arise when a light reflection point has arisen inside the device for some reason.

There arises a problem that re-coupling of this leakage light with the waveguide degrades the characteristics of the optical device, such as an extinction ratio and cross talk, and thus, it becomes necessary to completely quench light at the dummy port 1307 in some way.

Among optical terminators having been proposed so far, there is an optical terminator which is structured such that a slot with an angle relative to a waveguide is provided at an edge portion of a dummy port, and afterwards, this slot is filled with an optical absorption material, such as carbon black (refer to PTL 1 and PTL 2). However, this method makes fabrication processes therefor more complex because of additional processes of forming a slot, filling the formed slot with an optical absorption material, and the like, and further, the fabrication processes therefor becomes more difficult because of the occurrence of exfoliation thereof and the like. Thus, this method results in high cost, and further, problems in reliability, a variation of performance and the like have been significant problems.

Further, it has been proposed to fabricate a structure for scattering light at an edge portion of a dummy port (PTL 3). In this proposal, nevertheless, there has been a significant problem that this scattering of light results in the occurrence of stray light, so that this stray light gives adverse effects, such as the lowering of an extinction ratio and the occurrence of cross talk, on other optical devices. Further, even if light can be scattered not within a face on which an optical device is mounted but in an upward and downward direction relative to the face, the scattered light is likely to be coupled with an optical receiver and the like installed in a package containing the optical device, and thus, this has been a significant problem.

Further, there has been proposed a structure which allows light to leak from a core included in a waveguide connected to a dummy port by causing the core to be of a forward tapered shape, and allows a metallic material or the like covering the surrounding of the core to optically absorb the leaked light (PTL 4). In this technology, nevertheless, there has been a problem that conditions for a fabrication process of causing the core included in the waveguide to be of the forward tapered shape are so severe that it is difficult to fabricate such a taper of the forward tapered shape.

CITATION LIST

Patent Literature

[PTL 1] Japanese Patent Application Laid-Open No. 2008-176145
[PTL 2] Japanese Patent Application Laid-Open No. 2009-282449
[PTL 3] Japanese Patent Application Laid-Open No. 2010-181906
[PTL 4] Japanese Patent Application Laid-Open No. 2010-186132

Non Patent Literature

[NPL 1] R. A. Soref and B. R. Bennett, "Electrooptical Effect in Silicon", IEEE Journal of Quantum Electronics, Vol. QE-23, No. 1, pp. 123-129, 1987.

SUMMARY OF INVENTION

Technical Problem

As described above, in the related technologies, there have been problems: a troublesome and difficult process of fabricating a structure for a light termination; high manufacture cost; and low reliability and a variation of performance. Further, there has been also a problem that leakage light is difficult to be completely blocked off. Moreover, as a further problem to be particularly described here, there has been a problem regarding a light reflection at a boundary face between an optic waveguide and an optical termination structure. In PTL 2, it is not easy to block off leakage light completely because a refractive index of an optical waveguide (for example, in the case of Si, n=around 3.45) and a refractive index of an optical terminator (for example, in the case of carbon black, N=around 1.8+i7) are different from each other, and thus, it is difficult to sufficiently suppress an increase of reflectivity due to a reflection and scattering at a boundary face connecting the optical waveguide and the optical terminator.

The present invention has been made in order to solve the aforementioned problems, and its object is to make it possible to block off the leakage light more easily.

Solution to Problem

An optical waveguide type optical terminator according to an aspect of the present invention forms an optical waveguide structure including at least an optical absorption core which is formed on a clad layer and includes a portion composed of silicon in which an impurity of $10^{19}$ cm$^{-3}$ or more is doped, and is used by being optically connected in series to an optical waveguide including a core composed of silicon.

Advantageous Effects of Invention

As described above, according to the aspect of the invention, the optical absorption core including a portion composed of silicon in which an impurity of $10^{19}$ cm$^{-3}$ or more is doped is optically connected in series to the optical waveguide including a core composed of silicon, and thus, it is possible to obtain an excellent advantageous effect in that the leakage light can be blocked off more easily.

DESCRIPTION OF EMBODIMENTS

Hereinafter, exemplary embodiments of the present invention will be described with reference to the drawings.

Exemplary Embodiment 1

Figure 1A:
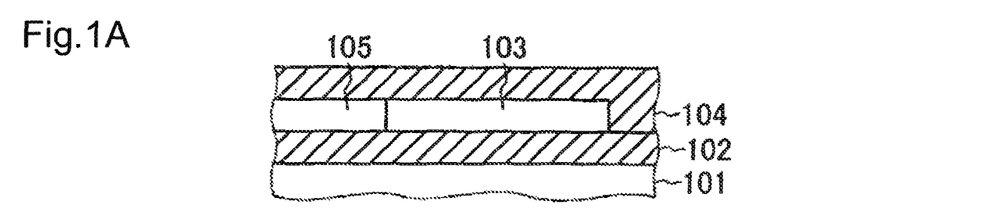
FIG. 1A is a block diagram illustrating a configuration of an optical waveguide type optical terminator according to exemplary embodiment 1 of the present invention.
Figure 1B:
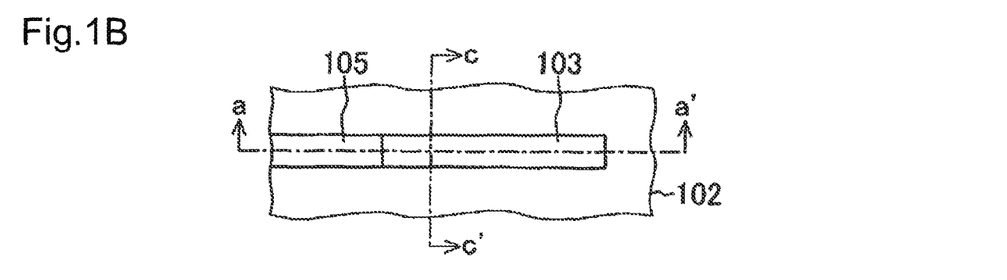
FIG. 1B is a block diagram illustrating a configuration of an optical waveguide type optical terminator according to exemplary embodiment 1 of the present invention.
Figure 1C:
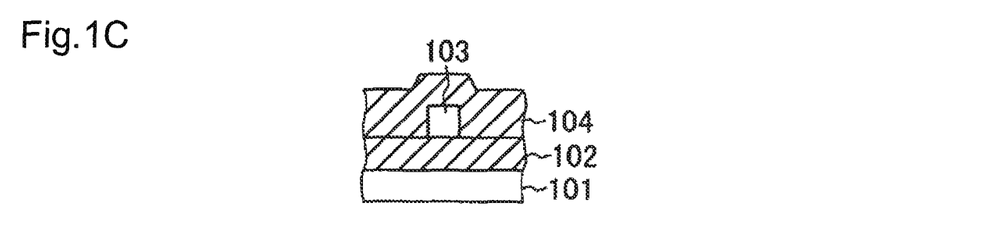
FIG. 1C is a block diagram illustrating a configuration of an optical waveguide type optical terminator according to exemplary embodiment 1 of the present invention.
Figure 1D:
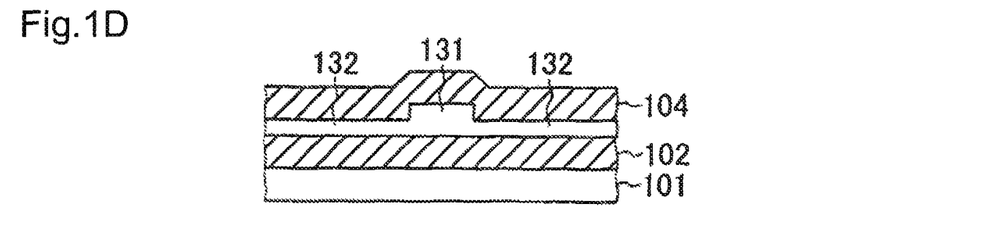
FIG. 1D is a block diagram illustrating a configuration of an optical waveguide type optical terminator according to exemplary embodiment 1 of the present invention.

First, exemplary embodiment 1 of the present invention will be described with reference to FIGS. 1A-1D. FIGS. 1A-1D are block diagrams illustrating a configuration of an optical waveguide type optical terminator according to exemplary embodiment 1 of the present invention. FIG. 1A, FIG. 1C and FIG. 1D are sectional views. Further, FIG. 1B is a plan view. FIG. 1A illustrates a sectional view taken along the line aa' of FIG. 1B, and FIG. 1C illustrates a sectional view taken along the line cc' of FIG. 1B. FIG. 1A illustrates a section parallel to a wave guiding direction, and FIG. 1C illustrates a section perpendicular to the wave guiding direction.

This optical waveguide type optical terminator forms an optical waveguide structure including at least an optical absorption core 103 which is formed on a clad layer 102 and includes a portion composed of silicon in which an impurity of $10^{19}$ cm$^{-3}$ or more is doped, and is used by being optically connected in series to an optical waveguide including a core 105 (a main core) composed of silicon. In this exemplary embodiment, both of the optical absorption core 103 and the core 105 are formed on the clad layer 102. Further, a clad layer 104 is formed on the optical absorption core 103 and the core 105. This clad layer 104 is formed so as to cover the optical absorption core 103 and the core 105 on the clad layer 102. Further, the clad layer 102 is formed on a substrate 101.

The optical absorption core 103 has a section whose width and height are each around 0.3-0.4 μm. In this regard, the core 105 is the same. In addition, in this description, the width corresponds to a size of a section perpendicular to the wave guiding direction, the size being a size in a direction parallel to the flat face of the substrate 101. Further, the height corresponds to a size of a section perpendicular to the wave guiding direction, the size being a size in a direction parallel to a normal line direction relative to the flat face of the substrate 101.

Further, the optical absorption core 103 is sufficient provided that at least an impurity of around $10^{19}$ cm$^{-3}$ is doped therein. For example, its impurity concentration is sufficient provided that it falls within a range of $10^{19}$-$10^{20}$ cm$^{-3}$. The existence of this impurity causes absorption of light inside the optical absorption core 103. Within such an impurity concentration range as described above, an absorption coefficient of silicon falls within a range from the 2nd power of 10 (1/cm) to the 3rd power of 10 (1/cm), and thus, an absorption length results in falling within a range from several tens of μm to several hundreds of μm. A boron material, a phosphorus material, an arsenic material or the like can be used as a material for this impurity.

The refractive index of silicon is around 3.45. Further, the refractive index of the optical absorption core 103, which is, as described above, heavily doped with an impurity, is around 3.35+i $10^{-2}$ (i is an imaginary unit) at a waveform length of 1.55 μm (refer to NPL 1) in the case where the impurity has an impurity concentration of $10^{20}$ cm$^{-3}$. Accordingly, at an optical coupling portion between the core 105 and the optical absorption core 103, a reflection due to a refractive index difference therebetween can be reduced.

The optical absorption core 103 of the above-described optical waveguide type optical terminator of this exemplary embodiment absorbs light, and thus, light having been waveguided in a waveguide portion including the core 105 is optically quenched gradually while propagating a waveguide portion including the optical absorption core 103. Further, in this exemplary embodiment, the optical absorption core 103 is formed so as to have a thickness the same as that of the core 105, and the heights thereof from the flat face of the substrate 101 up to the upper faces thereof are made the same with each other. For this reason, for example, forming (patterning) of the optical absorption core 103 and forming (patterning) of the core 105 can be simultaneously performed, and thus, it is possible to simplify the fabrication processes therefor to a great degree.

The configuration described above can be formed by employing, for example, a well-known a silicon-on-insulator (SOI) substrate. The configuration can be formed by forming a silicon base of the SOI substrate as the substrate 101, forming an embedded insulating layer (SiO$_2$; layer thickness of 2-3 μm) of the SOI substrate as the clad layer 102, and forming the optical absorption core 103 by using an SOI layer of the SOI substrate. Further, the clad layer 104 can be formed by depositing silicon oxide on the core formed in the SOI layer.

Further, the optical waveguide type optical terminator is not limited to a channel waveguide realized by the optical absorption core 103 having a section of a rectangular shape as described above. For example, as shown in FIG. 1D, it may be a rib waveguide including the optical absorption core 131 provided, at both the sides thereof, with slab layers 132. In this case, the width and the height of a section of the optical absorption core 131 should be each around 1-2 μm.

Next, a manufacturing method for an optical waveguide type optical terminator according to exemplary embodiment 1 will be described with reference to FIGS. 2A-2E. FIGS. 2A-2E are sectional views each being for use in description of a manufacturing method for an optical waveguide type optical terminator according to exemplary embodiment 1 of the present invention, and illustrating a section of the optical waveguide type optical terminator in a corresponding one of processes of the manufacturing method therefor.

Figure 2A:
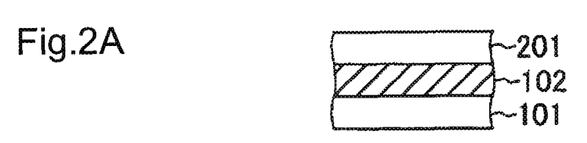
FIG. 2A is a sectional view being for use in description of a manufacturing method for an optical waveguide type optical terminator according to exemplary embodiment 1 of the present invention, and illustrating a section in a corresponding one of processes of the manufacturing method.

First, the SOI substrate is prepared, and as shown in FIG. 2A, the silicon base of the SOI substrate is fabricated as the substrate 101, and the embedded insulating layer thereof is fabricated as the clad layer 102. An SOI layer 201 is provided on the clad layer 102.

Figure 2B:
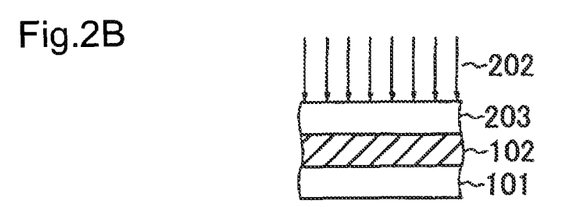
FIG. 2B is a sectional view being for use in description of a manufacturing method for an optical waveguide type optical terminator according to exemplary embodiment 1 of the present invention, and illustrating a section in a corresponding one of processes of the manufacturing method.

Next, as shown in FIG. 2B, through an ion implantation process 202, an impurity is doped to form an impurity doped silicon layer 203. An area into which the impurity is to be doped should correspond to an area where the optical absorption core 103 is to be formed. After completion of the ion implantation, annealing processing for activating the doped impurity is also performed.

Figure 2C:
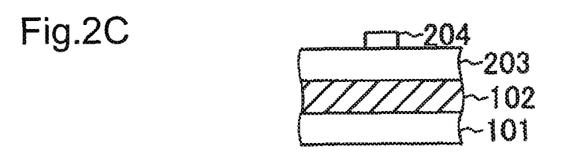
FIG. 2C is a sectional view being for use in description of a manufacturing method for an optical waveguide type optical terminator according to exemplary embodiment 1 of the present invention, and illustrating a section in a corresponding one of processes of the manufacturing method.

Next, as shown in FIG. 2C, a resist pattern 204 is formed on the impurity doped silicon layer 203 by means of a publicly known photolithography technology. The resist pattern 204 is a mask for forming cores, and this resist pattern 204 should be formed from an area that is included in a region other than the impurity doped silicon layer 203 in the SOI layer, and that corresponds to an area in which a core constituting the optical waveguide is to be formed, up to an area in which a core constituting the optical waveguide type optical terminator is to be formed.

Figure 2D:
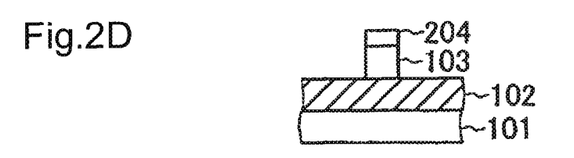
FIG. 2D is a sectional view being for use in description of a manufacturing method for an optical waveguide type optical terminator according to exemplary embodiment 1 of the present invention, and illustrating a section in a corresponding one of processes of the manufacturing method.

Next, as shown in FIG. 2D, the optical absorption core 103 is formed by using the resist pattern 204 as a mask, and performing a selective etching removal process on the SOI layer by means of a publicly known dry etching technology. At this time, the core 105 is also formed simultaneously in a not-illustrated area. After this process, the resist pattern 204 is removed.

Figure 2E:
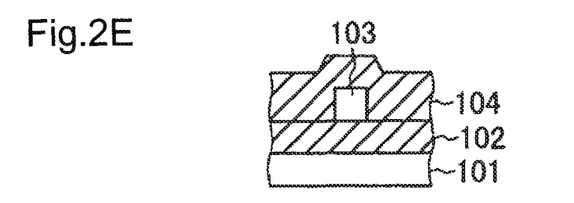
FIG. 2E is a sectional view being for use in description of a manufacturing method for an optical waveguide type optical terminator according to exemplary embodiment 1 of the present invention, and illustrating a section in a corresponding one of processes of the manufacturing method.

Next, as shown in FIG. 2E, the clad layer 104 is formed by depositing silicon oxide by means of, for example, a well-known CVD method. The above-described processes, that is, the process using the lithographic technology, the process using the dry etching technology, the ion implantation process and the annealing process, are standard processes for semiconductor manufacturing, and thus, it is possible to simplify fabrication processing for the optical waveguide type optical terminator.

Exemplary Embodiment 2

Figure 3:
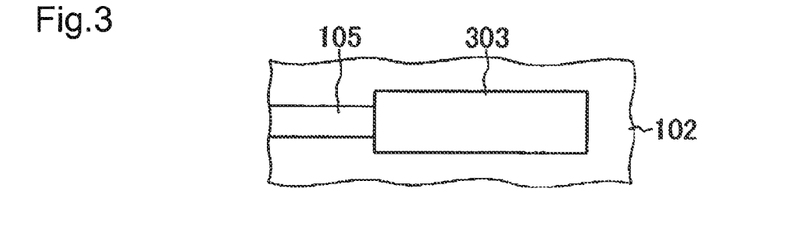
FIG. 3 is a plan view illustrating a configuration of an optical waveguide type optical terminator according to exemplary embodiment 2 of the present invention.

Next, exemplary embodiment 2 of the present invention will be described with reference to FIG. 3. FIG. 3 is a plan view illustrating a configuration of an optical waveguide type optical terminator according to exemplary embodiment 2 of the present invention. This optical waveguide type optical terminator forms an optical waveguide structure including at least an optical absorption core 303 which is formed on a clad layer 102 and is composed of silicon in which an impurity of $10^{19}$ cm$^{-3}$ or more is doped, and is used by being optically connected in series to an optical waveguide including a core 105. In exemplary embodiment 2, the width of the optical absorption core 303 is formed so as to be larger than that of the core 105. In addition, configurations other than these configurations are the same as those of exemplary embodiment 1 described above, and thus, description thereof is omitted here.

In exemplary embodiment 2, the optical absorption core 303 whose width is made larger is used, and thus, light having entered an area including the optical absorption core 303 in a waveguide (this area corresponding to the optical waveguide type optical terminator) also diffuses in a lateral direction (i.e., in a width direction) relative to a wave guiding direction, so that its light intensity is lowered (attenuated). Accordingly, making the width thereof larger enables realization of optical quenching within a shorter distance in a direction the same as the wave guiding direction. As a result, according to exemplary embodiment 2, the length of the optical absorption core 303 in the wave guiding direction can be made smaller.

Exemplary Embodiment 3

Figure 4:
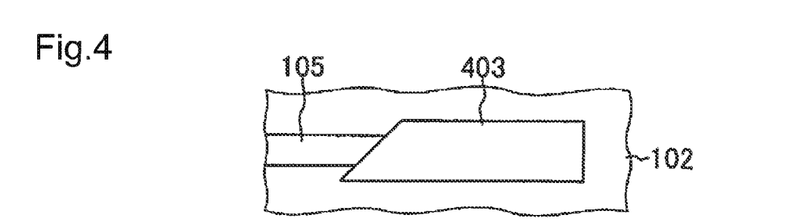
FIG. 4 is a plan view illustrating a configuration of an optical waveguide type optical terminator according to exemplary embodiment 3 of the present invention.

Next, exemplary embodiment 3 of the present invention will be described with reference to FIG. 4. FIG. 4 is a plan view illustrating a configuration of an optical waveguide type optical terminator according to exemplary embodiment 3 of the present invention. This optical waveguide type optical terminator forms an optical waveguide structure including at least an optical absorption core 403 which is formed on a clad layer 102 and is composed of silicon in which an impurity of $10^{19}$ cm$^{-3}$ or more is doped, and is used by being optically connected in series to an optical waveguide including a core 105. In exemplary embodiment 3, the width of the optical absorption core 403 is formed so as to be larger than that of the core 105. In addition, in exemplary embodiment 3, a joint face of an optical coupling portion between the optical absorption core 403 and the core 105 is formed so as to be inclined with an angle relative to a face perpendicular to a wave guiding direction. In addition, configurations other than these configurations are the same as those of exemplary embodiment 1 described above, and thus, description thereof is omitted here.

For example, the joint face of the optical coupling portion between the optical absorption core 403 and the core 105 is inclined with an angle of 45 degrees relative to a face perpendicular to the wave guiding direction. In addition, the joint surface is formed so as to be perpendicular to the flat face of the substrate. Making the joint face be inclined in this way enables further reduction of a light reflection at an incident edge face of the optical absorption core 403 with respect to light having been wave-guided in the waveguide including the core 105. In addition, the joint face described above may be formed of a curved face.

Exemplary Embodiment 4

Figure 5:
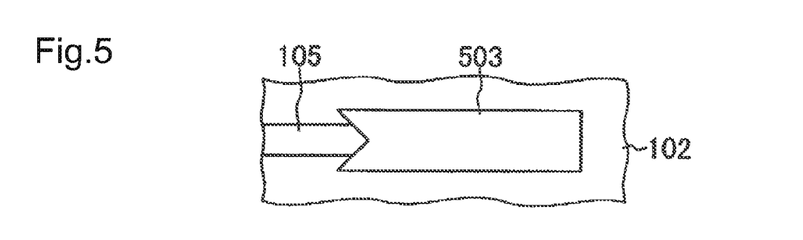
FIG. 5 is a plan view illustrating a configuration of an optical waveguide type optical terminator according to exemplary embodiment 4 of the present invention.
Figure 6:
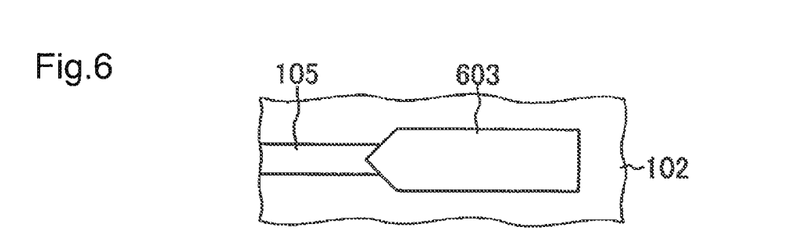
FIG. 6 is a plan view illustrating a configuration of another optical waveguide type optical terminators according to exemplary embodiment 4 of the present invention.

Next, exemplary embodiment 4 of the present invention will be described with reference to FIG. 5 and FIG. 6. FIG. 5 and FIG. 6 are plan views each illustrating a configuration of an optical waveguide type optical terminator according to exemplary embodiment 4 of the present invention. Referring to FIG. 5, an optical waveguide type optical terminator forms an optical waveguide structure including at least an optical absorption core 503 which is formed on a clad layer 102 and is composed of silicon in which an impurity of $10^{19}$ cm$^{-3}$ or more is doped, and is used by being optically connected in series to an optical waveguide including a core 105. The width of the optical absorption core 503 is formed so as to be larger than that of the core 105.

Referring to FIG. 6, an optical waveguide type optical terminator forms an optical waveguide structure including at least an optical absorption core 603 which is formed on a clad layer 102 and is composed of silicon in which an impurity of $10^{19}$ cm$^{-3}$ or more is doped, and is used by being optically connected in series to an optical waveguide including a core 105. The width of the optical absorption core 603 is formed so as to be larger than that of the core 105.

In exemplary embodiment 4, an optical coupling portion between the optical absorption core 503 and the core 105 is formed in a taper-like shape when viewed from the top thereof. In this case, the core 105 is formed in a shape whose width gradually becomes narrower towards the edge of the optical coupling portion. Similarly, an optical coupling portion between the optical absorption core 603 and the core 105 is formed in a taper-like shape when viewed from the top thereof. In this case, the optical absorption core 603 is formed in a shape whose width gradually becomes narrower towards the edge of the optical coupling portion. These configurations make it possible to, just like in exemplary embodiment 3 described above, further reduce a light reflection at the incident edge face of the optical absorption core 503 or the optical absorption core 603 with respect to light having been wave-guided in the waveguide including the core 105. In addition, in this exemplary embodiment, similarly, the joint face may be formed of a curved face.

Exemplary Embodiment 5

Figure 7A:
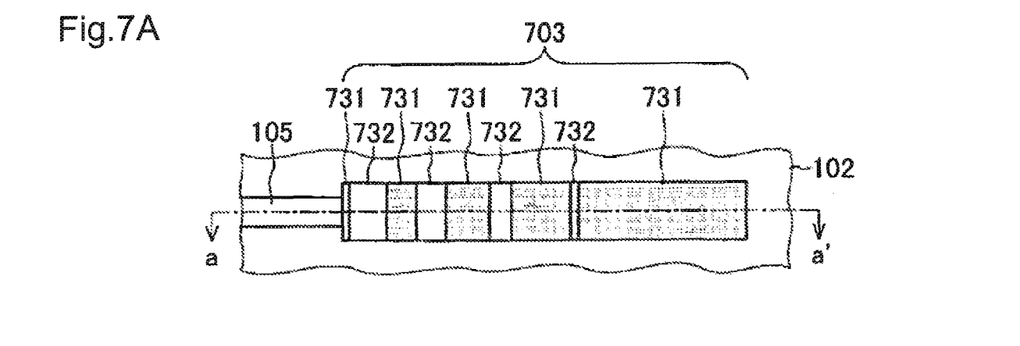
FIG. 7A is a plan view illustrating a configuration of an optical waveguide type optical terminator according to exemplary embodiment 5 of the present invention.
Figure 7B:
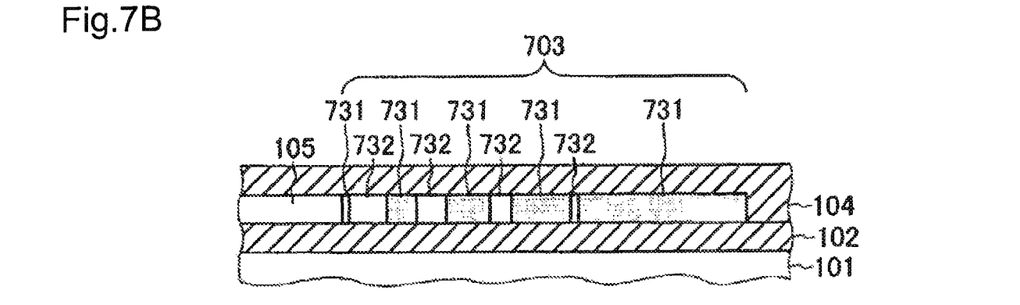
FIG. 7B is a sectional view illustrating a configuration of an optical waveguide type optical terminator according to exemplary embodiment 5 of the present invention.

Next, exemplary embodiment 5 of the present invention will be described with reference to FIG. 7A and FIG. 7B. FIG. 7A and FIG. 7B are a plan view and a sectional view, respectively, for illustrating a configuration of an optical waveguide type optical terminator according to exemplary embodiment 5 of the present invention.

This optical waveguide type optical terminator forms an optical waveguide structure including at least an optical absorption core 703 which is formed on a clad layer 102 and includes a portion composed of silicon in which an impurity of $10^{19}$ cm$^{-3}$ or more is doped, and is used by being optically connected in series to an optical waveguide including a core 105 composed of silicon. In exemplary embodiment 5, the width of the optical absorption core 703 is formed so as to be larger than that of the core 105.

In addition, the optical absorption core 703 is configured such that doped portions 731, each of which includes an impurity doped therein, and non-doped portions 732, each of which does not include the impurity doped therein, are respectively arranged so as to be alternate with each other in the wave guiding direction. In other words, a plurality of doped portions 731 and a plurality of non-doped portions 732 are respectively arranged so as to be alternate with each other in the optical wave guiding direction. Further, a wave-guiding-direction length of each of the doped portions 731 is formed such that the wave-guiding-direction length of the doped portion 731 becomes longer as the position of the doped portion 731 becomes farther from a joint portion via which the optical absorption core 703 is jointed to the core 105. On the other hand, a wave-guiding-direction length of each of the non-doped portions 732 is formed such that the wave-guiding-direction length of the non-doped portion 732 becomes longer as the position of the non-doped portion 732 becomes nearer the joint portion via which the optical absorption core 703 is jointed to the core 105. In other words, an optical wave-guiding-direction length of each of the plurality of doped portions 731 becomes longer as the position of the doped portion 731 becomes farther from a joint portion via which the optical absorption core 703 and the core 105 are jointed to each other; while an optical wave-guiding-direction length of each of the plurality of non-doped portions 732 becomes longer as the position of the non-doped portion 732 becomes nearer the joint portion. This configuration enables the optical absorption core 703 to be in a state where an average area density of the impurity at a portion of the optical absorption core 703 becomes lower as the position of the portion of the optical absorption core 703 becomes nearer a connection face via which the optical absorption core 703 is connected to the core 105.

Further, configurations other than these configurations are the same as those of exemplary embodiment 1 described above in the respects that, for example, the optical absorption core 703 is formed so as to have a height the same as that of the core 105, and the like, and thus, description thereof is omitted here.

According to the optical waveguide type optical terminator of exemplary embodiment 5, light having entered the optical waveguide type optical terminator results in detecting each of the doped portions 731 on a step-by-step basis in the optical absorption core 703. As a result, a reflection of light which enters the optical absorption core 703 can be reduced. Here, the doped portions 731 and the non-doped portions 732, which are respectively arranged so as to be alternate with each other in the wave guiding direction, changes their respective wave-guiding-direction lengths within a range of size smaller than or equal to the wavelength of wave-guided light. It can be conceived by those skilled in the art that this structure can be easily controlled by employing a mask pattern for selectively doping an impurity. In addition, although, in each of FIG. 7A and FIG. 7B, there is illustrated a configuration in which one of the doped portions 731 is provided at an optical coupling portion (the joint portion) via which the optical absorption core 703 is optically coupled with the core 105, a configuration therefor is not limited to this configuration, and may be made such that one of the non-doped portions 732 is provided at the optical coupling portion.

Exemplary Embodiment 6

Figure 8:
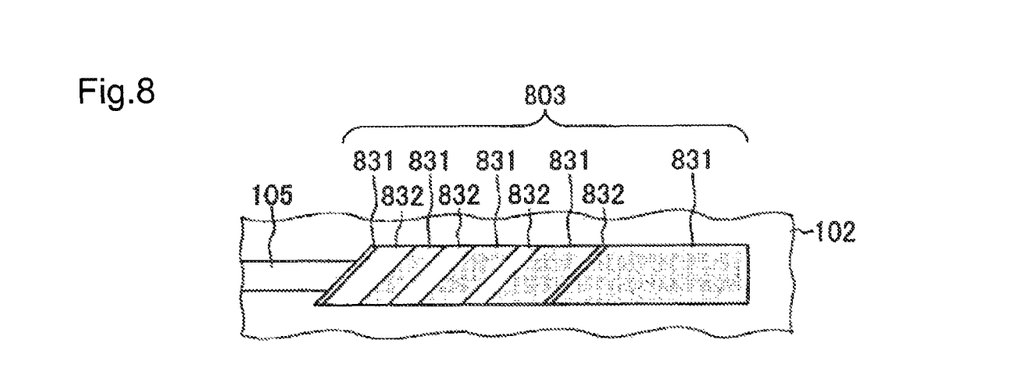
FIG. 8 is a plan view illustrating a configuration of an optical waveguide type optical terminator according to exemplary embodiment 6 of the present invention.

Next, exemplary embodiment 6 of the present invention will be described with reference to FIG. 8. FIG. 8 is a plan view illustrating a configuration of an optical waveguide type optical terminator according to exemplary embodiment 6 of the present invention. This optical waveguide type optical terminator forms an optical waveguide structure including at least an optical absorption core 803 which is formed on a clad layer 102 and is composed of silicon in which an impurity of $10^{19}$ cm$^{-3}$ or more is doped, and is used by being optically connected in series to an optical waveguide including a core 105.

In exemplary embodiment 6, the width of the optical absorption core 803 is formed so as to be larger than that of the core 105. Further, the optical absorption core 803 is configured such that doped portions 831, each of which includes an impurity doped therein, and non-doped portions 832, each of which does not include the impurity doped therein, are respectively arranged so as to be alternate with each other in a wave-guiding direction. Further, a wave-guiding-direction length of each of the doped portions 831 is formed such that the wave-guiding-direction length of the doped portion 831 becomes longer as the position of the doped portion 831 becomes farther from a joint portion via which the optical absorption core 803 is jointed to the core 105. On the other hand, a wave-guiding-direction length of each of the non-doped portions 832 is formed such that the wave-guiding-direction length of the non-doped portion 832 becomes longer as the position of the non-doped portion 832 becomes nearer the joint portion via which with the optical absorption core 803 is jointed to the core 105.

In addition, in exemplary embodiment 6, a joint face of an optical coupling portion between the optical absorption core 803 and the core 105 is formed so as to be inclined with an angle relative to a face perpendicular to the wave guiding direction, and similarly, boundary faces between the doped portions 831 and the non-doped portions 832 are respectively formed so as to be inclined with an angle relative to the face perpendicular to the wave guiding direction. For example, the joint face and the boundary faces are each inclined with 45 degrees relative to the face perpendicular to the wave guiding direction. In addition, the joint face and the boundary faces are each formed so as to be perpendicular to the flat face of the substrate. In addition, configurations other than these configurations are the same as those of exemplary embodiment 1 described above, and thus, description thereof is omitted here.

Making the joint face and the boundary faces be each inclined in this way enables further reduction of a light reflection at the incident edge face of the optical absorption core 803 with respect to light having been wave-guided through the waveguide including the core 105. In addition, the above joint face and boundary faces may be each formed of a curved face.

Exemplary Embodiment 7

Figure 9:
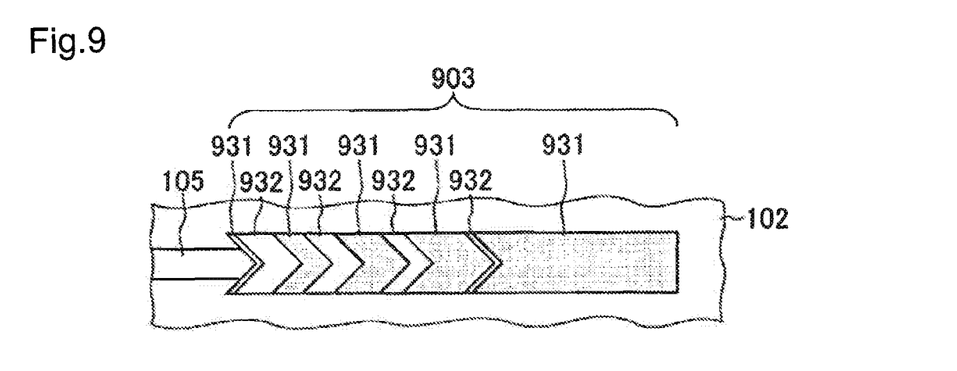
FIG. 9 is a plan view illustrating a configuration of an optical waveguide type optical terminator according to exemplary embodiment 7 of the present invention.
Figure 10:
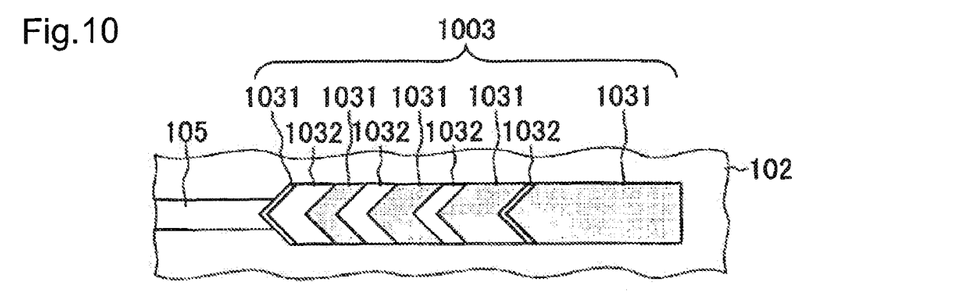
FIG. 10 is a plan view illustrating a configuration of another optical waveguide type optical terminators according to exemplary embodiment 7 of the present invention.

Next, exemplary embodiment 7 of the present invention will be described with reference to FIG. 9 and FIG. 10. FIG. 9 and FIG. 10 are plan views each illustrating a configuration of an optical waveguide type optical terminator according to exemplary embodiment 7 of the present invention. Referring to FIG. 9, an optical waveguide type optical terminator forms an optical waveguide structure including at least an optical absorption core 903 which is formed on a clad layer 102 and is composed of silicon in which an impurity of $10^{19}$ cm$^{-3}$ or more is doped, and is used by being optically connected in series to an optical waveguide including a core 105. The width of the optical absorption core 903 is formed so as to be larger than that of the core 105.

Further, the optical absorption core 903 is configured such that doped portions 931, each of which includes an impurity doped therein, and non-doped portions 932, each of which does not include the impurity doped therein, are respectively arranged so as to be alternate with each other in a wave-guiding direction. The plurality of doped portions 931 and the plurality of non-doped portions 932 are respectively arranged so as to be alternate with each other in the optical wave-guiding direction. Further, a wave-guiding-direction length of each of the doped portions 931 is formed such that the wave-guiding-direction length of the doped portion 931 becomes longer as the position of the doped portion 931 becomes farther from a joint portion via which the optical absorption core 903 is jointed to the core 105. On the other hand, a wave-guiding-direction length of each of the non-doped portions 932 is formed such that the wave-guiding-direction length of the non-doped portion 932 becomes longer as the position of the non-doped portion 932 becomes nearer the joint portion via which the optical absorption core 903 is jointed to the core 105. In other words, an optical wave-guiding-direction length of each of the plurality of doped portions 931 becomes longer as the position of the doped portion 931 becomes farther from a joint portion via which the optical absorption core 903 and the core 105 are jointed to each other; while an optical wave-guiding-direction length of each of the plurality of non-doped portions 932 becomes longer as the position of the non-doped portion 932 becomes nearer the joint portion.

Referring to FIG. 10, an optical waveguide type optical terminator forms an optical waveguide structure including at least an optical absorption core 1003 which is formed on a clad layer 102 and is composed of silicon in which an impurity of $10^{19}$ cm$^{-3}$ or more is doped, and is used by being optically connected in series to an optical waveguide including a core 105. The width of the optical absorption core 1003 is formed so as to be larger than that of the core 105.

Further, the optical absorption core 1003 is configured such that doped portions 1031, each of which includes an impurity doped therein, and non-doped portions 1032, each of which does not include the impurity doped therein, are respectively arranged so as to be alternate with each other in the wave-guiding direction. The plurality of doped portions 1031 and the plurality of non-doped portions 1032 are respectively arranged so as to be alternate with each other in the optical wave-guiding direction. Further, a wave-guiding-direction length of each of the doped portions 1031 is formed such that the wave-guiding-direction length of the doped portion 931 becomes longer as the position of the doped portion 1031 becomes farther from a joint portion via which the optical absorption core 1003 is jointed to the core 105. On the other hand, a wave-guiding-direction length of each of the non-doped portions 1032 is formed such that the wave-guiding-direction length of the non-doped portion 1032 becomes longer as the position of the non-doped portion 932 becomes nearer the joint portion via which with the optical absorption core 1003 is jointed to the core 105. An optical wave-guiding-direction length of each of the plurality of doped portions 1031 becomes longer as the position of the doped portion 1031 becomes farther from a joint portion via which the optical absorption core 1003 and the core 105 are jointed to each other; while an optical wave-guiding-direction length of each of the plurality of non-doped portions 1032 becomes longer as the position of the non-doped portion 1032 becomes nearer the joint portion.

In exemplary embodiment 7, an optical coupling portion between the optical absorption core 903 and the core 105 and boundary faces between the doped portions 831 and the non-doped portions 832 are each formed in a taper-like shape when viewed from the top thereof. In this case, the core 105 is formed in a shape whose width gradually becomes narrower towards the edge of the optical coupling portion. Similarly, an optical coupling portion between the optical absorption core 1003 and the core 105 and boundary faces between the doped portions 931 and the non-doped portions 932 are each formed in a taper-like shape when viewed from the top thereof. In this case, the optical absorption core 1003 is formed in a shape whose width gradually becomes narrower towards the edge of the optical coupling portion. These configurations make it possible to, just like in exemplary embodiment 6 described above, further reduce a light reflection at the incident edge face of the optical absorption core 903 or the optical absorption core 1003 with respect to light having been wave-guided through the waveguide including the core 105. Further, in this exemplary embodiment, the joint face also may be each formed of a curved face.

Exemplary Embodiment 8

Figure 11A:
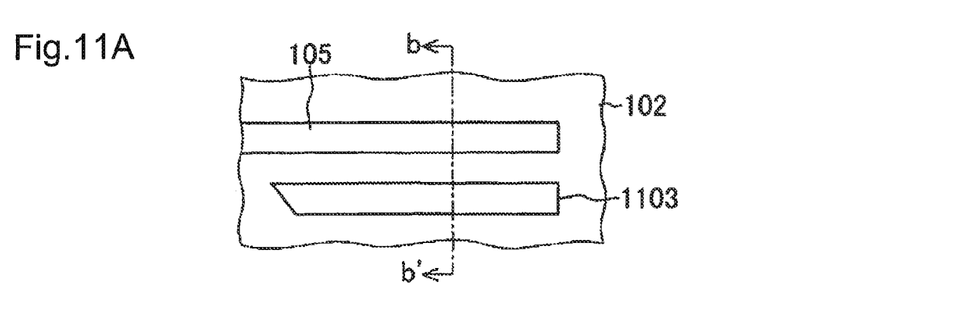
FIG. 11A is a plan view illustrating a configuration of an optical waveguide type optical terminator according to exemplary embodiment 8 of the present invention.
Figure 11B:
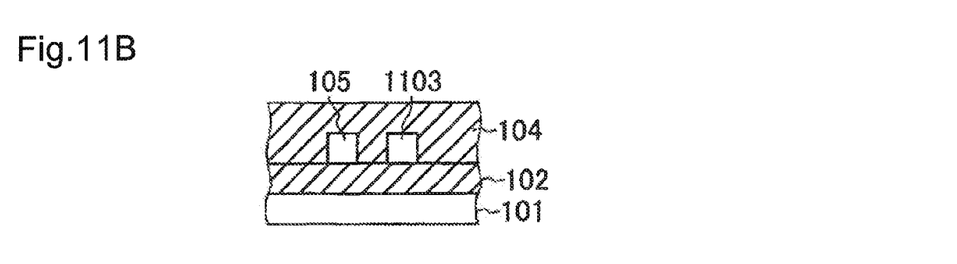
FIG. 11B is a sectional view illustrating a configuration of an optical waveguide type optical terminator according to exemplary embodiment 8 of the present invention.

Next, exemplary embodiment 8 of the present invention will be described with respect to FIG. 11A and FIG. 11B. FIG. 11A and FIG. 11B are a plan view and a sectional view, respectively, for illustrating a configuration of an optical waveguide type optical terminator according to exemplary embodiment 8 of the present invention.

This optical waveguide type optical terminator forms an optical waveguide structure including at least an optical absorption core 1103 which is formed on a clad layer 102 and includes a portion composed of silicon in which an impurity of $10^{19}$ cm$^{-3}$ or more is doped, and is in a state constituting a directional coupler by being arranged parallel to an optical waveguide including a core 105 composed of silicon.

Light from the optical waveguide including the core 105 is subjected to optical absorption by being coupled with the optical absorption core 1103. Making the optical waveguide type optical terminator in a state constituting a directional coupler allows light to gradually move from the core 105 to the optical absorption core 1103, and thus, enables reduction of a light reflection caused by the optical absorption core 1103.

Here, the edge of the optical absorption core 1103 is made a taper-like shape when viewed from the top thereof, but structure therefor is not limited to this structure, and may be made a curved waveguide structure. In exemplary embodiment 8, each of the cores is not limited to a rectangle waveguide (a channel waveguide), but may be a rib waveguide. In addition, configurations other than these configurations are the same as those of exemplary embodiment 1 described above, and thus, description thereof is omitted here.

Figure 12:
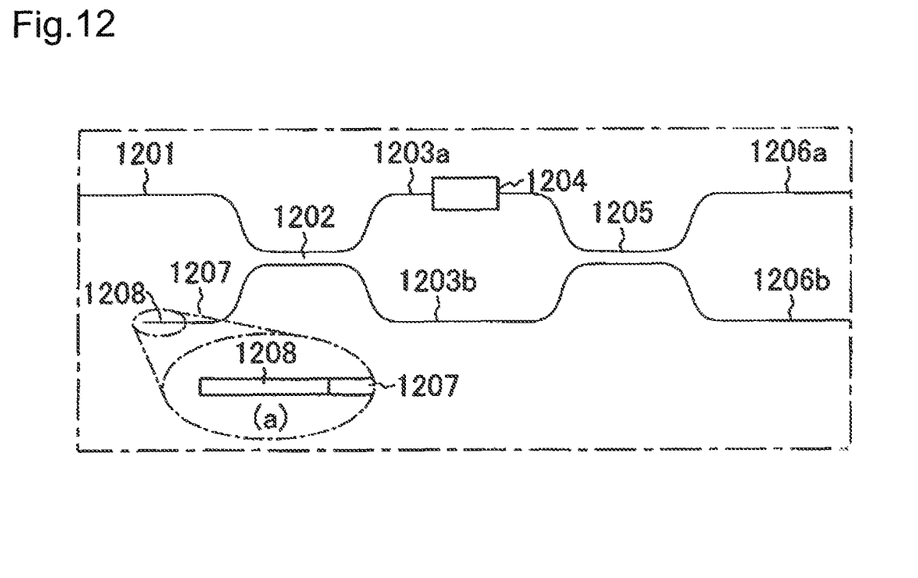
FIG. 12 is a plan view illustrating a configuration of an optical switch including an optical waveguide type optical terminator according to an exemplary embodiment of the present invention.

Next, an example in which an optical waveguide type optical terminator according to an aspect of the present invention is applied to an optical switch including a Mach-Zehnder interferometer will be described with reference to FIG. 12. FIG. 12 is a plan view illustrating a configuration of an optical switch including an optical waveguide type optical terminator according to an exemplary embodiment of the present invention. Further, a portion denoted by (a) in FIG. 12 is a plan view of an enlarged portion.

This optical switch is provided with a optical absorption core 1103 that includes a portion composed of silicon in which an impurity of $10^{19}$ cm$^{-3}$ or more is doped, and that is connected in series to an output edge of a dummy port 1207.

This optical switch turns on/off of each of light rays outputted from output ports 1206a and 1206b by causing a directional coupler 1202 to split a light ray from an input port 1201 into two light rays, causing a phase shifter 1204 to control a light phase difference between light rays having passed through two arms 1203a and 1203b, and then, causing a directional coupler 1205 to merge the light rays having passed through the two arms into a light ray again. At this time, a dummy port 1207 is terminated by being connected in series to the optical absorption core 1103, and thus, even when leakage light towards the dummy port 1207 arises, it is absorbed by the optical absorption core 1103. As a result, the occurrence of leakage light and stray light can be suppressed.

In addition, the optical waveguide type optical terminator which is connected to the dummy port 1207 may be any one of the optical waveguide type optical terminators of exemplary embodiments described above. The optical absorption core 1103 may form a rectilinear structure, and as a matter of course, may include a curve waveguide. A mounting area in which the optical waveguide type optical terminator is mounted can be made smaller by incorporating such a curved waveguide into a waveguide, and folding the waveguide.

It is to be noted here that the present invention is not limited to the aforementioned exemplary embodiments. Obviously, various modifications and combinations can be made within a scope not departing from the technical thought of the present invention, by a person having normal knowledge in the art.

This application is based upon and claims the benefit of priority from Japanese Patent Application No. 2011-115520, filed on May 24, 2011, the disclosure of which is incorporated herein in its entirety by reference.

Further, the aforementioned exemplary embodiments may be partially or as a whole summarized in the following supplementary notes, although not limited thereto.

(Supplementary Note 1)

An optical waveguide type optical terminator configured to: include a clad layer formed on a substrate, and an optical absorption core that is formed on the clad layer and includes a portion composed of silicon in which an impurity of $10^{19}$ cm$^{-3}$ or more is doped, the clad layer and the optical absorption core being optically connected in series to an optical waveguide including a main core composed of silicon.

(Supplementary Note 2)

The optical waveguide type optical terminator according to supplementary note 1, wherein a shape of a section of the optical absorption core is the same as a shape of a section of the core.

(Supplementary Note 3)

The optical waveguide type optical terminator according to supplementary note 2, wherein the core and the optical absorption core are each formed so as to be spaced from the substrate by a same distance.

(Supplementary Note 4)

The optical waveguide type optical terminator according to supplementary notes 1, wherein an impurity average area density at a portion of the optical absorption core becomes lower as a position of the portion becomes nearer a connection face via which the optical absorption core and the core are connected to each other.

(Supplementary Note 5)

The optical waveguide type optical terminator according to supplementary note 4, wherein the optical absorption core includes a plurality of doped portions in each of which an impurity is doped and a plurality of non-doped portions in each of which the impurity is not doped; the doped portions and the non-doped portions are respectively arranged so as to be alternate with each other in an optical wave-guiding direction; an optical wave-guiding-direction length of each doped portion of the doped portions becomes longer as a position of the doped portion becomes farther from a joint portion via which the optical absorption core and the main core are jointed to each other; and an optical wave-guiding-direction length of each non-doped portion of the non-doped portions becomes longer as a position of the non-doped portion becomes nearer the joint portion.

REFERENCE SIGNS LIST

101: Substrate, 102: Clad layer, 103: Optical absorption core, 104: Clad layer and 105: Core

The invention claimed is:

1. An optical waveguide type optical terminator comprising:
a clad layer formed on a substrate, and an optical absorption core that is formed on the clad layer and includes a portion composed of silicon in which an impurity of $10^{19}$ cm$^{-3}$ or more is doped, the clad layer and the optical absorption core being optically connected in series with an optical waveguide including a main core composed of silicon,
wherein an impurity average area density at a portion of the optical absorption core becomes lower as a position of the portion becomes nearer a connection face via which the optical absorption core and the main core are connected to each other.

2. The optical waveguide type optical terminator according to claim 1, wherein a shape of a section of the optical absorption core is the same as a shape of a section of the main core.

3. The optical waveguide type optical terminator according to claim 2, wherein the main core and the optical absorption core are each formed so as to be spaced from the substrate by a same distance.

4. The optical waveguide type optical terminator according to claim 1, wherein the optical absorption core includes a plurality of doped portions in each of which an impurity is doped and a plurality of non-doped portions in each of which the impurity is not doped; the doped portions and the non-doped portions are respectively arranged so as to be alternate with each other in an optical wave-guiding direction; an optical wave-guiding-direction length of each doped portion of the doped portions becomes longer as a position of the doped portion becomes farther from a joint portion via which the optical absorption core and the main core are jointed to each other; and an optical wave-guiding-direction length of each non-doped portion of the non-doped portions becomes longer as a position of the non-doped portion becomes nearer the joint portion.

* * * * *